(12) United States Patent
Fujisawa

(10) Patent No.: US 11,605,035 B2
(45) Date of Patent: Mar. 14, 2023

(54) USER TERMINAL FOR DISTRIBUTING AUTOMOBILE AND AUTOMOBILE DISTRIBUTION SYSTEM

(71) Applicant: Kazunori Fujisawa, Tokyo (JP)

(72) Inventor: Kazunori Fujisawa, Tokyo (JP)

( * ) Notice: Subject to any disclaimer, the term of this patent is extended or adjusted under 35 U.S.C. 154(b) by 0 days.

(21) Appl. No.: 17/073,787

(22) Filed: Oct. 19, 2020

(65) Prior Publication Data

US 2021/0103868 A1   Apr. 8, 2021

(30) Foreign Application Priority Data

Aug. 28, 2019   (JP) .............................. JP2019-155610

(51) Int. Cl.
*G06Q 10/06* (2012.01)
*G06Q 10/02* (2012.01)
*G06Q 10/0631* (2023.01)

(52) U.S. Cl.
CPC ....... *G06Q 10/06311* (2013.01); *G06Q 10/02* (2013.01)

(58) Field of Classification Search
CPC .......................... G06Q 10/06311; G06Q 10/02
USPC ............................................................ 705/5
See application file for complete search history.

(56) References Cited

U.S. PATENT DOCUMENTS

| | | | | |
|---|---|---|---|---|
| 6,006,672 A | * | 12/1999 | Newfarmer | A63G 3/00 104/23.2 |
| 9,008,827 B1 | * | 4/2015 | Dwarakanath | A47F 3/0482 700/216 |
| 9,020,633 B1 | * | 4/2015 | Chen | H01L 21/67769 700/218 |
| 9,194,705 B2 | * | 11/2015 | Nonner | G01C 21/3423 |
| 9,773,281 B1 | * | 9/2017 | Hanson | G06Q 40/08 |

(Continued)

FOREIGN PATENT DOCUMENTS

| | | |
|---|---|---|
| JP | 2002-008194 A | 1/2002 |
| JP | 2002-222245 A | 8/2002 |
| JP | 2004-310316 A | 11/2004 |

OTHER PUBLICATIONS

"App-Based, On-Demand Ride Services: Comparing Taxi and Resourcing Trips and User Characteristics in San Francisco" Published by University of California Transportation Center (Year: 2014).*

*Primary Examiner* — Zeina Elchanti

(74) *Attorney, Agent, or Firm* — Muncy, Geissler, Olds & Lowe, P.C.

(57) ABSTRACT

A user terminal for distributing an automobile and an automotive distribution system that can enhance convenience of a user at a time of an automotive distribution request, and a program that is executed in them are provided. In the user terminal for distributing an automobile or the automotive distribution system, a terminal control device accepts waiting times until a vehicle is distributed to a current position of the user terminal identified by a current position identifying device or the like, from the user via an operation input device. The terminal control device causes a display device to display one or a plurality of vehicles that can be distributed, for each of the waiting times that are accepted. When a single vehicle requested to be distributed is selected from vehicles that can be distributed via the operation input device, the terminal control device executes automotive distribution request processing of the vehicle requested to be distributed.

9 Claims, 10 Drawing Sheets

(56) References Cited

U.S. PATENT DOCUMENTS

| | | | |
|---|---|---|---|
| 9,925,997 B2* | 3/2018 | Wesselink | G06Q 10/08 |
| 2001/0027375 A1* | 10/2001 | Machida | G08G 1/096811 |
| | | | 701/533 |
| 2014/0058896 A1* | 2/2014 | Jung | G06Q 30/0623 |
| | | | 705/26.61 |
| 2014/0279652 A1* | 9/2014 | Kim | G06Q 10/0833 |
| | | | 705/333 |
| 2015/0095198 A1* | 4/2015 | Eramian | G06Q 30/0629 |
| | | | 705/26.64 |
| 2017/0039488 A1* | 2/2017 | Lin | G08G 1/202 |
| 2019/0057312 A1* | 2/2019 | Li | G06N 5/04 |
| 2019/0057326 A1* | 2/2019 | Li | G06Q 10/02 |
| 2019/0204110 A1* | 7/2019 | Dubielzyk | G01C 21/3438 |
| 2019/0204992 A1* | 7/2019 | Bowden | G01C 21/3438 |
| 2019/0206009 A1* | 7/2019 | Gibson | G06Q 10/06315 |
| 2020/0005205 A1* | 1/2020 | Tsur | G06Q 10/0631 |
| 2020/0012956 A1* | 1/2020 | Ikeda | G06N 20/00 |
| 2020/0132499 A1* | 4/2020 | Majima | G06F 16/29 |
| 2020/0286020 A1* | 9/2020 | Kobayashi | G06Q 10/06312 |
| 2020/0312147 A1* | 10/2020 | Xia | G06F 16/29 |

* cited by examiner

USER TERMINAL FOR DISTRIBUTING AUTOMOBILE AND AUTOMOBILE DISTRIBUTION SYSTEM

BACKGROUND OF THE INVENTION

Field of the Invention

The present invention relates to a user terminal for distributing an automobile used in distribution of a taxi or the like and an automotive distribution request, an automotive distribution system using the user terminal for distributing an automobile, and a program executed in the user terminal for distributing an automobile and the automotive distribution system.

Description of the Related Art

Conventionally, contrivances have been made concerning an automotive distribution system that can grasp the operation state of vehicles, and enables customers to perform distribution of moving vehicles and automotive distribution requests via terminals.

For example, a vehicle reservation system and an operation state management device have been proposed which enable users to acquire the operation state of vehicles and make automotive distribution requests to drivers of the vehicles via the Internet (Japanese Patent Laid-Open No. 2002-008194).

To be more specific, Japanese Patent Laid-Open No. 2002-008194 discloses an operation state management device in a management station that wirelessly communicates with mobile stations of vehicles, and is characterized by including, a driver information database storing driver information of the driver for each of the vehicles, a receiving unit receiving a reservation condition including positional information and date and time information for reserving distribution of the vehicles, from users, a wireless transmission unit transmitting the reservation condition to the mobile stations of the vehicles, a wireless receiving unit receiving a response desiring automotive distribution from at least one of the mobile stations of the vehicles to which the reservation condition was transmitted, an extraction unit extracting, for the vehicles from which a response was received, the driver information for the users to request distribution of the vehicles to the drivers from the driver information database, and a transmitting unit transmitting the driver information that is extracted, to the users via the Internet.

Further, there is also provided a taxi information provision support method or the like that gives convenience of enlargement of taxi selectivity or the like to customers, and gives benefit of improving the occupancy state of vehicles to a taxi company side (Japanese Patent Laid-Open No. 2002-222245).

To be more specific, Japanese Patent Laid-Open No. 2002-222245 discloses a taxi information provision support method that causes a support center, by computer processing, to acquire customer current position information that is transmitted from a mobile phone terminal of a customer, to refer to taxi current position information transmitted from taxis to select a taxi transmitting taxi current position information corresponding to the customer current position information acquired from the customer, to calculate a customer waiting time that is equal to a time necessary for the selected taxi to move from the taxi current position to the customer current position, to refer to taxi company information stored in advance to extract taxi company information of a taxi company to which the selected taxi belongs, to transmit the extracted taxi company information and the calculated customer waiting time to the mobile phone terminal of the customer, and supports provision of taxi information useful for the customer to find the taxi.

Further, there is also provided an automotive distribution processing device or the like that rationalizes automotive distribution processing (Japanese Patent Laid-Open No. 2004-310316).

To be more specific, Japanese Patent Laid-Open No. 2004-310316 discloses an automotive distribution processing device that carries out automotive distribution processing of distributing a vehicle to a customer in response to a request of the customer, and is characterized by including traveling state information acquiring means that acquires traveling state information concerning a traveling state of the vehicle from a vehicle communication terminal device loaded on the vehicle and capable of transmission and reception of information, vehicle information storing means that stores the traveling state information acquired by the traveling state information acquiring means by associating the traveling state information with vehicle information concerning the vehicle, automotive distribution request information acquiring means that acquires automotive distribution request information including customer automotive distribution position information concerning an automotive distribution position requested by the customer, and customer destination position information concerning a destination position of the customer, and concerning the vehicle requested by the customer, distributable vehicle searching means that searches for a vehicle enabling the automotive distribution, based on the automotive distribution request information acquired by the automotive distribution request information acquiring means, and the vehicle information and the traveling state information stored in the vehicle information storing means, and automotive distribution processing means that transmits the automotive distribution request information acquired by the automotive distribution request information acquiring means to the vehicle communication terminal device loaded on the vehicle based on the vehicle information stored in the vehicle information storing means and corresponding to the vehicle enabling the automotive distribution, as information urging automotive distribution.

However, in the related arts, no contrivance has been made from the viewpoint of flexible processing in consideration of a situation of a customer (user) (For example, a current position and location, date and time, and the like. Fluid intention of the user to wait for up to certain minutes, and the like.). Further, improvements by utilizing reservation records of customers (users) are also expected.

SUMMARY OF THE INVENTION

Accordingly, a user terminal for distributing an automobile according to one embodiment of the present invention includes an operation input device accepting an operation input of a user, a terminal communication device wirelessly communicating with an outside, a display device, and a terminal control device controlling the operation input device, the terminal communication device and the display device, wherein the terminal control device accepts waiting times until a vehicle is distributed to a current position of the user terminal identified by a current position identifying device, or a target automotive distribution position inputted via the operation input device from the user via the operation input device, causes the display device to display one or a plurality of vehicles that can be distributed, for each of the waiting times that are accepted, and when a single vehicle requested to be distributed is selected from the vehicles that can be distributed via the operation input device, executes automotive distribution request processing of the vehicle requested to be distributed.

According to the above described embodiment, when the vehicle requested to be distributed is selected from the one or the plurality of vehicles that can be distributed, and are displayed for each waiting time accepted from the user, the automotive distribution request processing for the vehicle requested to be distributed is executed. Accordingly, the waiting time can be set by the user himself or herself, and when the waiting time is not an allowable time for the user, the user can put off or cancel the automotive distribution request. Accordingly, it is possible to enhance convenience of the user.

Note that the waiting time mentioned here may be used as the distance from the current position of the vehicle to the current position of the user terminal or the target position.

The terminal control device causes the display device to display one or a plurality of the vehicles that can be distributed with vehicle attribute information of the vehicles that can be distributed, for each of the waiting times that are accepted. Further, the vehicle attribute information may include at least one of a current position, an affiliation company, a usage price, a vehicle model name, and a number of passengers that can board the vehicle of each of the vehicles that can be distributed.

Thereby, it becomes possible for the user to determine whether or not to make an automotive distribution request after confirming the vehicle attribute information of the vehicles that can be distributed in addition to the waiting time. For example, when a plurality of vehicles that can be distributed with the same waiting time are displayed, it becomes possible for the user to compare the vehicle attribute information and select the vehicle requested to be distributed. Accordingly, it is possible to further enhance the convenience of the user.

The operation input device may be a touch panel, for example. Further, the terminal control device may cause the touch panel to display a slider or a radio button as input display of the waiting time. Thereby, the user can input the waiting time smoothly.

The terminal control device may cause one or a plurality of the vehicles that can be distributed to be displayed on a map screen in the display device, for each of the waiting times that are accepted by the operation input device. Thereby, it becomes possible for the user himself or herself to determine the waiting time and select the vehicle requested to be distributed if the user has a good knowledge of the place, for example. Accordingly, it is possible to further enhance the convenience of the user.

The terminal control device may cause the display device to display the vehicles that can be distributed with a shortest waiting time and the shortest waiting time, before accepting the waiting times from the user. Thereby, it becomes possible for the user to know the shortest waiting time easily.

Further, an automotive distribution system according to one embodiment of the present invention includes a plurality of vehicles each including a current position detection device, a vehicle communication device, and a vehicle control device, a plurality of user terminals each including an operation input device, a terminal communication device, a display device, and a terminal control device, and an automotive distribution management server including a server communication device, and a server control device, wherein the vehicle control device of each of the plurality of vehicles transmits a current position of each of the plurality of vehicles detected by the current position detection device to the automotive distribution management server with vehicle identification information of each of the vehicles at a predetermined timing, the server control device holds the current position received from each of the vehicles with the vehicle identification information, each of the user terminals starts automotive distribution guidance processing when accepting an automotive distribution guidance request from a user via the operation input device, the automotive distribution management server transmits, to the user terminal, vehicle information of one or a plurality of vehicles that can be distributed, which includes a waiting time itself or information necessary for identifying the waiting time, upon reception of the waiting time inputted by the operation input device of the user terminal, or a current position of the user terminal or a target automotive distribution position, the user terminal causes the display device to display one or a plurality of the vehicles that can be distributed corresponding to the waiting time inputted to the operation input device by using the vehicle information received from the automotive distribution management server, when a single vehicle requested to be distributed is selected from the vehicles that can be distributed via the operation input device, the user terminal transmits an automotive distribution request of the vehicle requested to be distributed to the automotive distribution management server, the automotive distribution management server receiving the automotive distribution request transmits an automotive distribution command including the current position of the user terminal or the target automotive distribution position, to the vehicle corresponding to the automotive distribution request, and the vehicle receiving the automotive distribution command displays the automotive distribution command on the vehicle display device, or moves the vehicle to the current position of the user terminal or the target automotive distribution position designated by the automotive distribution command.

According to the above described embodiment, when the vehicle requested to be distributed is selected from one or a plurality of vehicles that can be distributed, which are displayed correspondingly to the waiting time accepted from the user, the automotive distribution request of the vehicle requested to be distributed is performed, and automotive distribution of the vehicle requested to be distributed is performed. Accordingly, the user himself or herself can set the waiting time, and when the waiting time is not an allowable time for the user, the user can put off or cancel the automotive distribution request. Accordingly, the convenience of the user can be enhanced.

When the automotive distribution request is not made and cancellation is performed although the vehicles that can be distributed are displayed, in the user terminal, the user terminal may notify the automotive distribution management server of cancellation information. Further, the automotive distribution management server may associate the cancellation information with information concerning one or a plurality of the vehicles that can be distributed corresponding to the waiting time inputted to the operation input device and manage the cancellation information and the information concerning the one or the plurality of the vehicles that can be distributed corresponding to the waiting time. Thereby, it becomes possible to use cancellation by the user, and the waiting time (or the vehicles that can be distributed corresponding to the waiting time) by associating the cancellation by the user with the waiting time.

Further, a program according to one embodiment of the present invention operates on a user terminal for distributing an automobile including an operation input device accepting an operation input of a user, a terminal communication device wirelessly communicating with an outside, a display device, and a terminal control device controlling the operation input device, the terminal communication device, and the display device, and executes the steps of causing the terminal control device to accept waiting times until a vehicle is distributed to a current position of the user terminal identified by a current position identifying device, or a target automotive distribution position inputted via the operation input device from the user via the operation input device, cause the display device to display one or a plurality of vehicles that can be distributed, for each of the waiting times that are accepted, and when a single vehicle requested to be distributed is selected from the vehicles that can be distributed via the operation input device, execute automotive distribution request processing of the vehicle requested to be distributed.

Further, a program according to the present invention is executed on an automotive distribution system including a plurality of vehicles each including a current position detection device, a vehicle communication device, and a vehicle control device, a plurality of user terminals each including an operation input device, a terminal communication device, a display device, and a terminal control device, and an automotive distribution management server including a server communication device, and a server control device, and executes the steps of causing the vehicle control device of each of the plurality of vehicles to transmit a current position of each of the plurality of vehicles detected by the current position detection device to the automotive distribution management server with vehicle identification information of each of the vehicles at a predetermined timing, causing the server control device to hold the current position received from each of the vehicles with the vehicle identification information, causing the user terminal to start automotive distribution guidance processing when accepting an automotive distribution guidance request from a user via the operation input device, causing the automotive distribution management server to transmit, to the user terminal, vehicle information of one or a plurality of vehicles that can be distributed, which includes a waiting time itself or information necessary for identifying the waiting time, upon reception of the waiting time that is inputted by the operation input device of the user terminal, or a current position of the user terminal or a target automotive distribution position, causing the user terminal to cause the display device to display one or a plurality of the vehicles that can be distributed corresponding to the waiting time inputted to the operation input device by using the vehicle information received from the automotive distribution management server, when a single vehicle requested to be distributed is selected from the vehicles that can be distributed via the operation input device, causing the user terminal to transmit an automotive distribution request of the vehicle requested to be distributed to the automotive distribution management server, causing the automotive distribution management server receiving the automotive distribution request to transmit an automotive distribution command including the current position of the user terminal or the target automotive distribution position, to the vehicle corresponding to the automotive distribution request, and causing the vehicle receiving the automotive distribution command to display the automotive distribution command on the vehicle display device, or to move the vehicle to the current position of the user terminal or the target automotive distribution position designated by the automotive distribution command.

According to the automotive distribution system and the like according to one embodiment of the present invention, it is possible to exhibit an advantageous effect of being able to perform flexible processing in consideration of the situation of the customers (users). Further, according to the automotive distribution system and the like according to one embodiment of the present invention, an advantageous effect of being able to provide the improved automotive distribution system utilizing the cancellation records of customers (users), as necessary is exhibited.

DETAILED DESCRIPTION OF THE PREFERRED EMBODIMENTS

An automotive distribution system according to one embodiment of the present invention will be described in detail with reference to the drawings. Note that in the present embodiment, "automotive distribution or automotive distribution request" is a request for prompt arrangement of a vehicle to a current position (or a designated position), and is distinguished from "automotive distribution reservation" that specifies a future time and requests automotive distribution at the specified time (Hereinafter, "automotive distribution or automotive distribution request" will be simply called "automotive distribution" or "automotive distribution request".).

Figure 1:
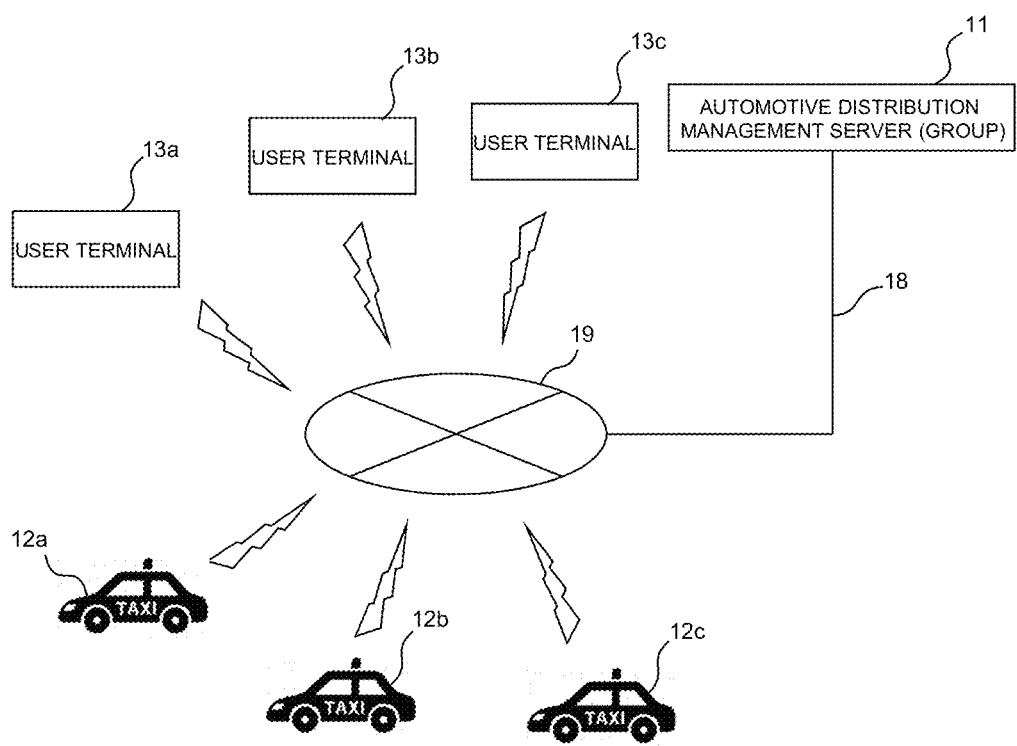
FIG. 1 is an explanatory diagram explaining an entire configuration example of an automotive distribution system according to one embodiment of the present invention.

FIG. 1 illustrates an entire configuration example of the automotive distribution system according to one embodiment of the present invention. As illustrated in FIG. 1, an automotive distribution system 10 is configured by an automotive distribution management server (group) 11, one or more vehicles 12a to 12c, various information processing devices used by users (FIG. 1 illustratively shows user terminals 13a to 13c as smartphones, mobile phones, mobile information terminals or tablet terminals. Hereinafter, also collectively referred to as "user terminals".), as a minimum configuration, and the server (group), the vehicles and the various terminals are connected communicably with one another by a dedicated line or a public line such as the Internet (18, as wired line) as illustrated in FIG. 1. The line may be wired or wireless, (information terminals including communication function in) the vehicles 12a to 12c and the user terminals 13a to 13c enter the Internet 19 via a base station, a wireless router or the like not illustrated wirelessly, and are further connected to the automotive distribution management server (group) 11 to be mutually communicable via the line 18.

Further, many user terminals at the time of filing the present application include a processing capacity (communication processing speed, image processing capacity and the like) equivalent to PC, and should be called compact computers.

Further, a program or software necessary to implement the present invention is normally installed or stored in an HDD, an SSD or the like in a storage unit of a terminal, and is read as a software module of all or a part of the program or software in a memory in the storage unit as necessary at a time of execution of the program or software, and is arithmetically operated and executed in a CPU.

Note that arithmetic operation and execution do not have to be performed in a central processing unit such as a CPU, and an auxiliary arithmetic operation device such as a digital signal processor (DSP) not illustrated can also be used.

Further, a hardware configuration of the automotive distribution management server 11 can also adopt a PC basically. Note that though present invention is not limited to this, the automotive distribution management server 11 can also adopt a configuration suitable for processing of large-scale data by operating a plurality of PCs in parallel in raising hardware specs as necessary.

Figure 2:
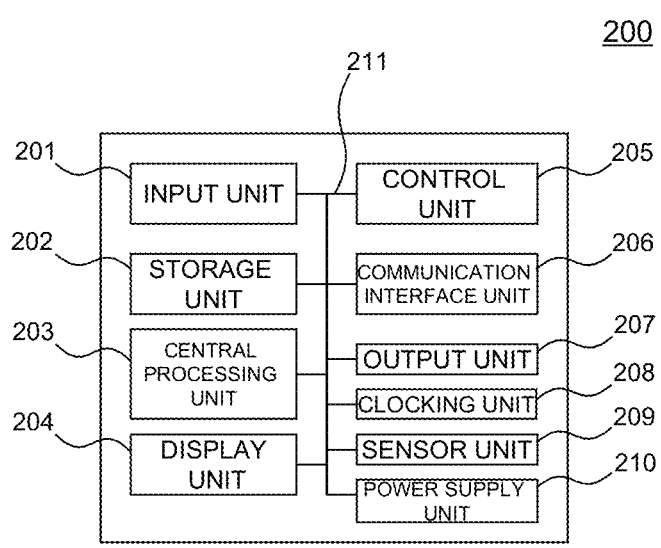
FIG. 2 is an explanatory diagram explaining functional blocks of a vehicle in the automotive distribution system according to one embodiment of the present invention.

FIG. 2 illustrates a functional block diagram of hardware configuring a system (hereinafter, also called a "vehicle system") that implements information processing in a vehicle 12 according to one embodiment of the present invention. An operation of the vehicle 12 is realized by individual operations of hardware described as follows, and a cooperative operation of them.

In FIG. 2, a vehicle system 200 as an entire hardware block is roughly composed of an input unit 201 configured by a hardware button not illustrated, a multi-touch input panel provided at a display, a microphone and the like, a storage unit 202 configured by a hard disk, a RAM and/or a ROM and the like, for storing programs, data and the like, a central processing unit 203 configured by a CPU that performs various numerical calculations and logical operations by programs, a display unit 204 configured by a display and the like, a control unit 205 for controlling chips, electrical systems and the like, a communication interface unit 206 configured by a slot for accessing the Internet and a port for performing optical communication, and/or a communication interface for accessing a vehicle operation management server via a dedicated wireless line or the like, an output unit 207 such as a speaker, vibration or the like, a clocking unit 208 for clocking a time or the like, a sensor unit 209 composed of an image sensor such as a CMOS and the like, and a power supply unit 210 for supplying a power source to respective modules in the device, and these modules are appropriately connected by a communication bus, and a feeder line (in FIG. 2, for convenience, the respective lines are collectively expressed as wiring 211 that is properly divided) as necessary.

Note that the sensor unit 209 includes a GPS sensor module for identifying a position of the vehicle system 200 (vehicle 12a or the like). Further, a signal detected by the image sensor such as a CMOS or the like configuring the sensor unit 209 is processed as input information in the input unit 201.

Further, the sensor unit 209 also includes a function of detecting and acquiring a service status of the vehicle (for example, empty, carrying a passenger, out-of-service, on its way to pick up a booked fare, chartered, resting).

Further, the program or software necessary to implement the present invention is normally installed or stored in the hard disk or the like configuring the storage unit 202, is read on the memory in the storage unit 202 as necessary as a software module of all or part of it at the time of execution of the program or software, and is arithmetically operated and executed in the CPU 203.

Note that arithmetic operation and execution do not have to be necessarily performed in the central processing unit 203 such as the CPU, and it is also possible to use an auxiliary operation device such as a digital signal processor (DSP) not illustrated.

Figure 3:
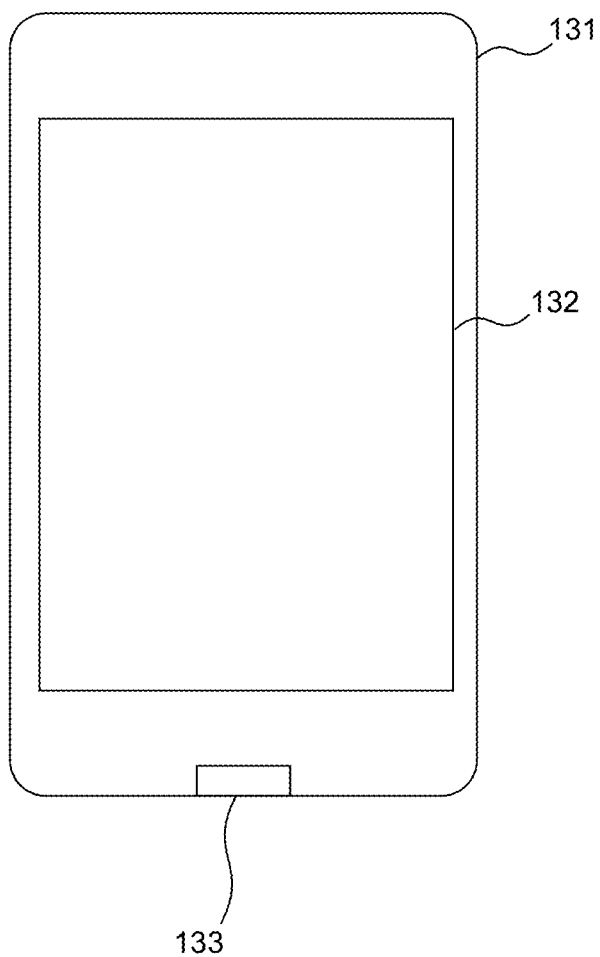
FIG. 3 is an explanatory view explaining an outer appearance configuration of a user terminal in the automotive distribution system according to one embodiment of the present invention.

FIG. 3 shows an outer appearance configuration of a smartphone (or a tablet terminal, but for convenience of explanation, a smartphone is adopted) as the user terminal (information processing device) according to one embodiment of the present invention. In FIG. 3, a user terminal (smartphone) 13 is composed of a casing portion 131, a display 132, and a hardware button 133 provided at a lower central portion of the casing 131. The display 132 is typically configured by a liquid crystal display (LCD) or the like and can display various kinds of information such as characters and images. Further, the display 132 is caused to display menu buttons or a software keyboard, and by touching this by a finger, a touch pen (not illustrated) or the like, an instruction (command) to the smartphone 13 can be made. In this respect, the above described hardware button 133 is not an essential component, but is mounted as a button that carries out a certain function, for convenience of explanation of the present invention. Certainly, it is also possible to replace the hardware button 133 with the menu button displayed on a part of the display 132.

Further, the display 132 includes the multi-touch input panel, and touch input position coordinates on the touch input panel are transmitted to a processing system (CPU) of the smartphone 13 via an input device interface (not illustrated) and is processed. The multi-touch input panel is configured to be able to sense a plurality of contact points to the panel simultaneously. The detection (sensor) can be realized by various methods and is not necessarily limited to the contact sensor, and it is also possible to extract points of instruction to the panel by using an optical type sensor, for example. Further, it is also possible to use an electrostatic capacitive type sensor that senses contact with human skin besides a contact type sensor and an optical type sensor, as the sensor.

Though not shown in FIG. 3, the smartphone 13 can also include a microphone, and a speaker. In this case, it is also possible to discriminate a voice of a user or the like picked up by the microphone to make it an input command. Furthermore, though not shown in FIG. 3, a camera device such as a CMOS is mounted on a back surface or the like of the smartphone 13.

Figure 4:
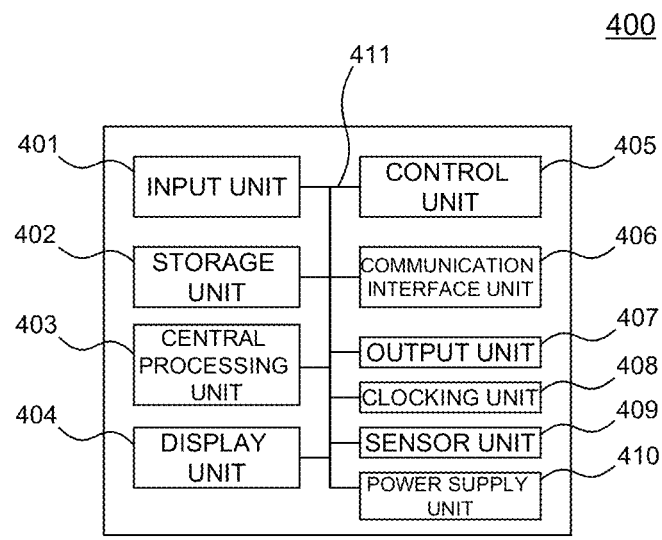
FIG. 4 is an explanatory diagram explaining functional blocks of the user terminal in the automotive distribution system according to one embodiment of the present invention.

FIG. 4 illustrates a functional block diagram of hardware configuring the smartphone 13 according to one embodiment of the present invention. An operation of the smartphone 13 is realized by individual operations of the hardware described as follows, and a cooperative operation of them.

In FIG. 4, a smartphone 400 as an entire hardware block is roughly composed of an input unit 401 configured by the hardware button 133 in FIG. 3, the multi-touch input panel provided at the display 132, the microphone and the like, a storage unit 402 configured by a hard disk for storing programs, data and the like, a RAM and/or a ROM and the like, a central processing unit 403 configured by a CPU that performs various numerical calculations and logical operations by the programs, a display unit 404 configured by the display 132 and the like, a control unit 405 for controlling chips, electric systems and the like, a communication interface unit 406 configured by a slot for accessing the Internet and a port for performing optical communication, and a communication interface, an output unit 407 such as a speaker, vibration and the like, a clocking unit 408 for clocking a time or the like, a sensor unit 409 composed of an image sensor such as a CMOS and the like, and a power supply unit 410 for supplying a power source for respective modules in the device, and these modules are connected properly by a communication bus, and power feed line (in FIG. 4, respective lines are collectively expressed as wiring 411 that is properly divided for convenience) as necessary.

Note that the sensor unit 409 includes a GPS sensor module for identifying a position of the smartphone 400 (13a or the like). Further, a signal detected by the image sensor such as a CMOS or the like configuring the sensor unit 409 is processed as input information in the input unit 401.

Further, the program or software necessary to implement the present invention are normally installed or stored in the hard disk or the like configuring the storage unit 402, and are read on the memory in the storage unit 402 as a software module of all or part of it as necessary at the time of execution of the program or software, and is arithmetically operated and executed in the CPU 403.

Note that arithmetic operation and execution do not necessarily performed in the central processing unit 403 such as a CPU, and it is also possible to use an auxiliary operation device such as a digital signal processor (DSP) not illustrated.

Figure 5:
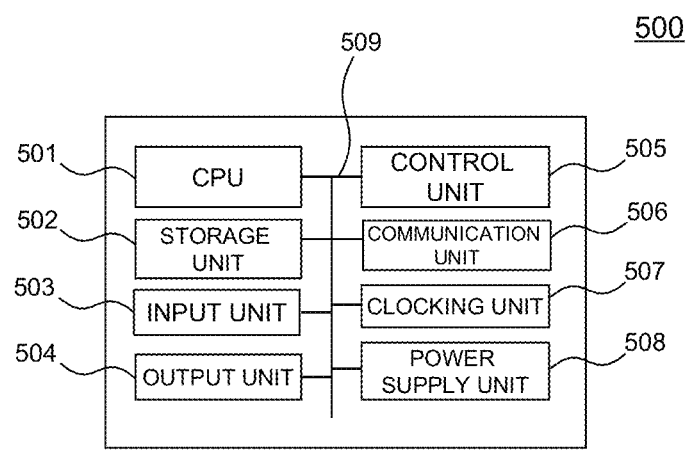
FIG. 5 is an explanatory diagram explaining functional blocks of an automotive distribution management server in the automotive distribution system according to one embodiment of the present invention.

FIG. 5 shows a functional block diagram of an automotive distribution management server (information management server) in the automotive distribution system according to one embodiment of the present invention. Illustratively, an operation of the automotive distribution management server is realized by individual operations of hardware described as follows, and a cooperative operation of software and the hardware.

In FIG. 5, an automotive distribution management server 500 as an entire hardware block is roughly composed of a CPU 501 for performing various kinds of comparison and operation processing, a storage unit 502 such as a RAM, a ROM, and a flash memory, an input unit 503 such as a keyboard, and a pointing device, an output unit 504 such as a display and a speaker, a control unit 505 for control of various signals, a communication (interface) unit 506 (wireless or wired), a clocking unit 507 for clocking a time or the like, and a power supply unit 508.

These modules are properly connected by a communication bus and a feeder line (in FIG. 5, the respective lines are collectively expressed as wiring 509 that is properly divided) as necessary.

Further, a program or software necessary to implement the present invention and executed on the automotive distribution management server 500 are normally installed or stored in a hard disk, SSD (Solid State Drive), a flash memory or the like configuring the storage unit 502, and are read as a software module of all or a part of it on the memory in the storage unit 502 as necessary at a time of execution of the program or software, and is arithmetically operated and executed in the CPU 501.

Note that arithmetic operation and execution do not necessarily have to be performed in the central processing unit such as the CPU 501, and is it also possible to use an auxiliary operation device such as a digital signal processor (DSP) not illustrated.

Next, an operation of the automotive distribution system or the information processing device (user terminal) in one embodiment according to the present invention will be described by using an operation flow or a flowchart in FIG. 6.

Figure 6:
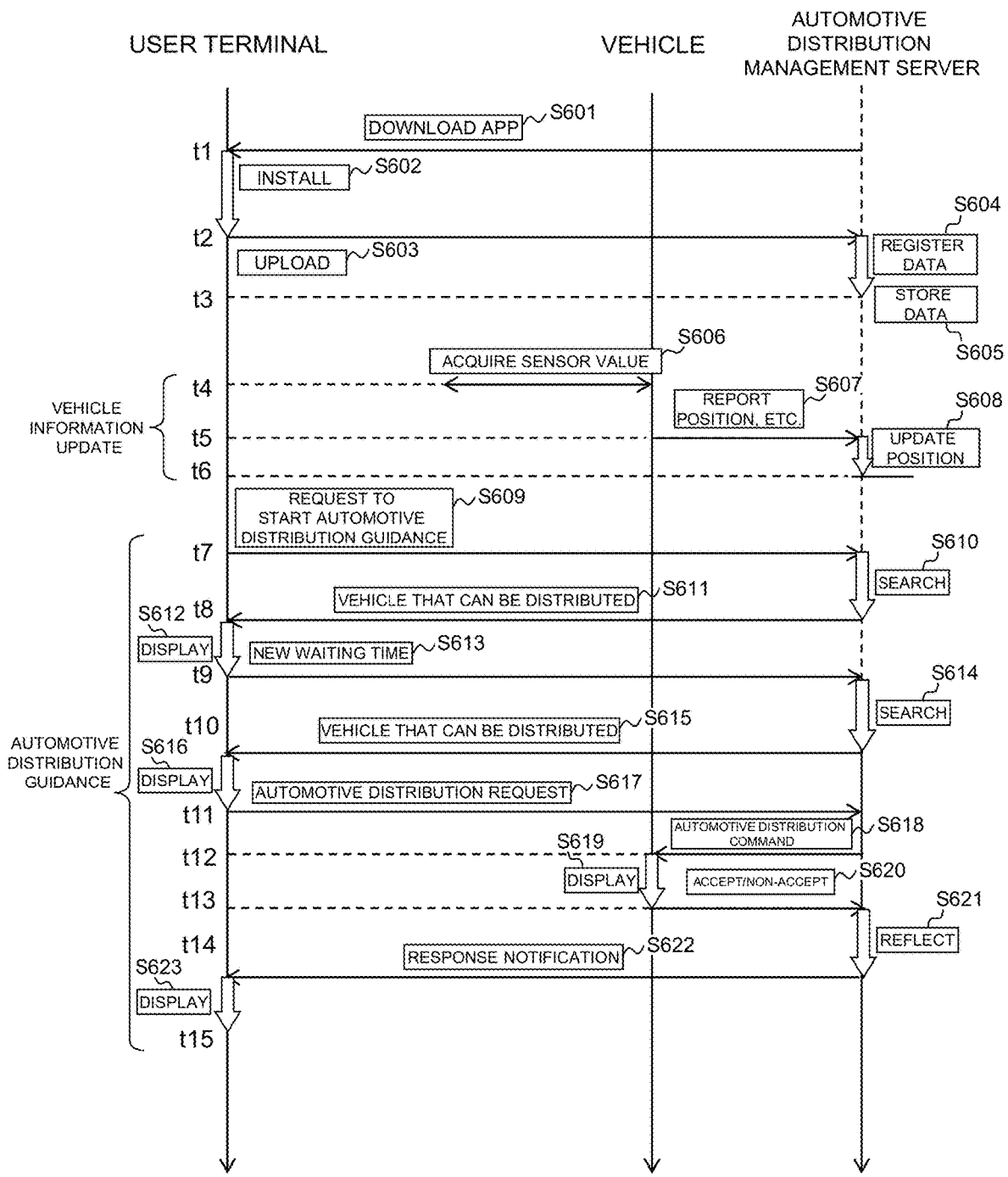
FIG. 6 is an explanatory diagram explaining an operation example of the automotive distribution system according to one embodiment of the present invention.

FIG. 6 shows an outline of an entire operation flow of the automotive distribution system in one embodiment of the present invention. In FIG. 6, "user terminal" is the information processing device, and the user terminals 13a to 13c in FIG. 1 correspond to the "user terminal", and reference signs 12a to 12c in FIG. 1 correspond to "vehicle". The automotive distribution management server 11 in FIG. 1 corresponds to "automotive distribution management server". In FIGS. 6, t1 to t15 show a time series flow, and operations and processing described later are performed over time.

First, at a time t1, a user (customer) downloads application software for operating an own user terminal as the information processing device according to the present invention from the automotive distribution management server via the user terminal (step S601). The application software is client software for processing part of the program according to the present invention. Subsequently, the user installs the downloaded application software on the user terminal (step S602). At this time, it is also possible to transmit (upload), from the user terminal, account information as in the following table to the automotive distribution management server to register and store the account information illustratively as necessary, besides an own name (nickname) of the user as user registration (time t2, steps S603 and S604).

TABLE 1

| Name (nickname) | Membership number (user ID) | Email address (mobile phone number) | Gender | Age (age group) | Payment information |
|---|---|---|---|---|---|
| | | | | | |

In the "payment information" in the above table, a credit card number or the like for credit card payment can be registered in advance, as an example (In this case, the name of the person or the like not illustrated is also a registration item.).

The above data items are stored on the automotive distribution management server as user data (time t3, step S605).

Next, from time t4 to time t6, vehicle information update processing is performed in which a vehicle reports its own status to the automotive distribution management server. In other words, the vehicle acquires sensor values from the sensor unit (209 in FIG. 2) (step S606). The sensor values in this case include, for example, a current position of the vehicle, a service status (for example, empty, carrying a passenger, out-of-service, on its way to pick up a booked fare, chartered, resting). Next, the vehicle transmits the current position and the service status of its own to the automotive distribution management server, with own identification information (vehicle ID) (step S607). The automotive distribution management server receiving the current position of the vehicle updates the current position of the vehicle corresponding to the vehicle ID (step S608). Further, the automotive distribution management server can also read vehicle attribute information (affiliation company, usage price, vehicle model name, number of passengers who can board, and the like) that is stored and managed in advance to correspond to the vehicle ID.

Note that transmission of the current position of the vehicle, and transmission of the service status of the vehicle may be separately performed. In this case, information update in the automotive distribution management server is also performed separately for the current position and the service status. In FIG. 6, processes of steps 606 to S608 are shown only once, and subsequent illustrations are omitted, but the processes of steps S606 to S608 are repeated at predetermined timings (for example, at periods of regular intervals (for example, substantially several seconds to several tens seconds)).

From times t7 to t15, automotive distribution guidance processing is performed. To be more specific, at a time t7, an automotive distribution guidance start request command is transmitted from the user terminal to the automotive distribution management server (step S609). The automotive distribution guidance start request command is a command for requesting start of the automotive distribution guidance processing, and is transmitted at a moment when a menu "Taxi distribution" displayed on the user terminal is selected. Alternatively, the automotive distribution guidance start request command may be transmitted at a moment when the application software installed in the user terminal is actuated. The automotive distribution guidance start request command includes identification information (user ID) of the user and a current position of the user terminal.

In times t7 to t8, the automotive distribution management server receiving the automotive distribution guidance start request command searches for a vehicle with a shortest estimated moving time (waiting time for the user) to the current position of the user terminal as a vehicle that can be distributed (step S610). The search is performed based on the current position of the user terminal, the current position and the service status (empty or not, in particular) of each vehicle, map information in the storage unit 502, and the like. At a time t8, the automotive distribution management server transmits a search result to the user terminal (step S611). The search result in this case includes a current position, a waiting time and vehicle attribute information of the vehicle (vehicle that can be distributed) with the shortest waiting time. The vehicle attribute information is an affiliation company, a usage price, a vehicle model name, the number of passengers who can board, or the like. The current position of the vehicle may be defined by being included in the vehicle attribute information.

At the time t8, the user terminal displays an automotive distribution guidance screen by using the search result received from the automotive distribution management server. In the case of the present embodiment, the vehicle that can be distributed with the shortest waiting time is displayed on a map screen (refer to FIG. 9). Though details will be described later with reference to FIGS. 9 and 10, in one embodiment of the present invention, the user can also set the waiting time. For example, when a minimum waiting time is three minutes (FIG. 9), it is possible to make a plurality of vehicles that can be distributed selectable by changing the waiting time to seven minutes (FIG. 10). In one embodiment, it is possible to set the waiting time by using a slider (902 or the like in FIG. 9).

Further, on the automotive distribution guidance scree, a cancel button (940 or the like in FIG. 9) is displayed. When the user cannot find a desired vehicle that can be distributed, the user can cancel or stop the automotive distribution guidance by pressing the cancel button. In one embodiment, the user terminal may transmit cancellation information to the automotive distribution management server. The automotive distribution management server receiving the cancellation information may change placement of the vehicle by using the cancellation information (details will be described later by referring to FIG. 11).

In one embodiment, the management server receiving the cancellation information can record and manage communication with the user terminal until the cancellation is made (the user position at that time and date and time, the number of times of changing the waiting time, a last specified waiting time until the cancellation, an operation time from the start of the operation to the cancellation and the like).

When the user changes the waiting time by moving the slider (in other words, re-enters a new waiting time), the user terminal transmits the new waiting time to the automotive distribution management server (time t9, step S613). The automotive distribution management server receiving the new waiting time searches for a vehicle (vehicle that can be distributed) corresponding to the new waiting time (time t9 to time t10, step S614). At a time t10, the automotive distribution management server transmits a new search result to the user terminal (step S615). The search result referred to here includes a current position, a waiting time and vehicle attribute information of the vehicle (vehicle that can be distributed) corresponding to the waiting time set by the user. In one embodiment, the vehicle (vehicle that can be distributed) that corresponds to the waiting time set by the user and can be obtained by search is a vehicle with a waiting time that is less than or equal to a user set value.

At the time t10, the user terminal displays the automotive distribution guidance screen by using the new search result received from the automotive distribution management server (step S616, refer to FIG. 10). When the user selects a specific vehicle (vehicle requested to be distributed) from vehicles that can be distributed and are displayed on the user terminal, the user terminal transmits an automotive distribution request command to the automotive distribution management server (time t11, step S617). The automotive distribution request command includes information on the vehicle ID of the vehicle requested to be distributed, the user ID and the current position of the user terminal (automotive distribution target position).

The vehicle distribution management server receiving the vehicle distribution request command transmits the automotive distribution command to the vehicle requested to be distributed (time t12, step S618). The automotive distribution command includes the target automotive distribution position (current position of the user terminal) and the user name, to the vehicle requested to be distributed. Note that it is possible that an automotive distribution request command was received from another user terminal before the automotive distribution management server receives the automotive distribution command. In other words, it is possible that the vehicle has already been determined to be distributed to another user. In such a case, the automotive distribution management server may transmit a message that vehicle distribution is not possible to the user terminal. The user terminal that receives the message like this may update the vehicle that can be distributed and received from the automotive distribution management server, and perform automotive distribution guidance again.

The vehicle (vehicle requested to be distributed) receiving the automotive distribution command displays a command content (target automotive distribution position and the user name) concerning automotive distribution, an acceptance button, and a nonacceptance button on the display unit (204 in FIG. 2) in the vehicle (time t12, step S619). A driver of the vehicle requested to be distributed confirms the command content, presses the acceptance button when automotive distribution is possible, and presses the nonacceptance button when automotive distribution is not possible. When the acceptance button or the nonacceptance button is pressed, the vehicle requested to be distributed notifies the automotive distribution management server of a response (acceptance or nonacceptance of automotive distribution) (time t13, step S620).

Here, in another embodiment of the present invention, step S619 to step S620 can be omitted. In this case, the automotive distribution management server that receives the automotive distribution request command transmits the automotive distribution command to the vehicle requested to be distributed, and the vehicle that receives the automotive distribution request forcefully heads for the target automotive distribution position (current position of the user terminal).

The automotive distribution management server reflects the response from the vehicle requested to be distributed in the storage unit (502 in FIG. 5) (times t13 to t14, step S621). The automotive distribution management server notifies the user terminal of the response from the vehicle requested to be distributed (time t14, step S622). Note when the response from the vehicle requested to be distributed is "not distributable", the automotive distribution management server may transmit the response with information on new vehicles that can be distributed, to the user terminal.

The user terminal that receives the response from the vehicle requested to be distributed via the automotive distribution management server displays a content of the response on the display unit (404 in FIG. 4) (times t14 to t15, step S623). When the response is "accepting to distribution", the user waits for the vehicle to be distributed on the spot. When the response is "not distributable", the user can select a new vehicle requested to be distributed by a similar method to the above. Alternatively, the user may cancel or stop the automotive distribution guidance by pressing the cancel button (940 or the like in FIG. 9).

Note that in the other embodiment of the present invention in which step S619 to step S620 are omitted, the response notice in step S622 (and display of the response content in step S623) is a notice that the vehicle that can be distributed heads for the target automotive distribution position (current position of the user terminal) (estimated time of arrival is displayed again as necessary).

Figure 7:
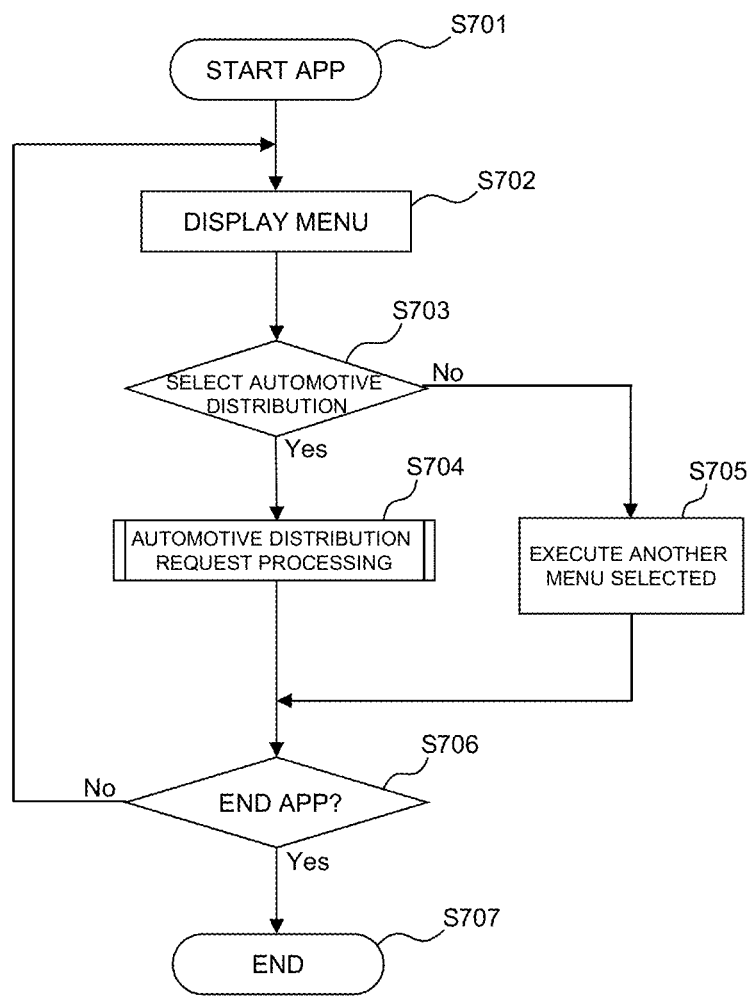
FIG. 7 is a flowchart explaining an operation flow example of the user terminal in the automotive distribution system according to one embodiment of the present invention.

FIG. 7 is a flowchart showing specific processing of the user terminal to realize the processing in FIG. 6. When the user commands the application software to actuate by using the input unit (touch panel) of the user terminal in step S701, the central processing unit of the user terminal actuates the application software. In step S702, the central processing unit causes the display unit to display menus not illustrated. The menus include "distribution of a taxi". As other menus, for example, "reservation of taxi distribution" may be included. Further, an end button (not illustrated) for ending the application is also displayed with the menus.

When "distribution of a taxi" is selected in the menus (step S703: Yes), the central processing unit executes the automotive distribution request processing for the user to request automotive distribution (step S704). Details of the automotive distribution request processing will be described in detail with reference to FIG. 8.

Returning to step S703 in FIG. 7, when the user does not select "distribution of a taxi" (step S703: No), the central processing unit waits for execution of a different selected menu (for example, "reservation of a taxi") other than "distribution of a taxi" (step S705). Note that, when a different menu is not selected, a plurality of menus are in a state of being still displayed in step S705, but return means not illustrated for returning to step S702, for example, without executing any application is assumed to exist, for convenience of explanation.

After step S704 or S705, the user terminal determines whether or not to end the application (step S706). Specifically, the user terminal determines whether or not the end button is selected in a state where the menus are displayed. In a case of ending the application (step S706: Yes), the central processing unit ends the application (step S707). In a case of not ending the application (step S706: No), the central processing unit returns to step S702.

Figure 8:
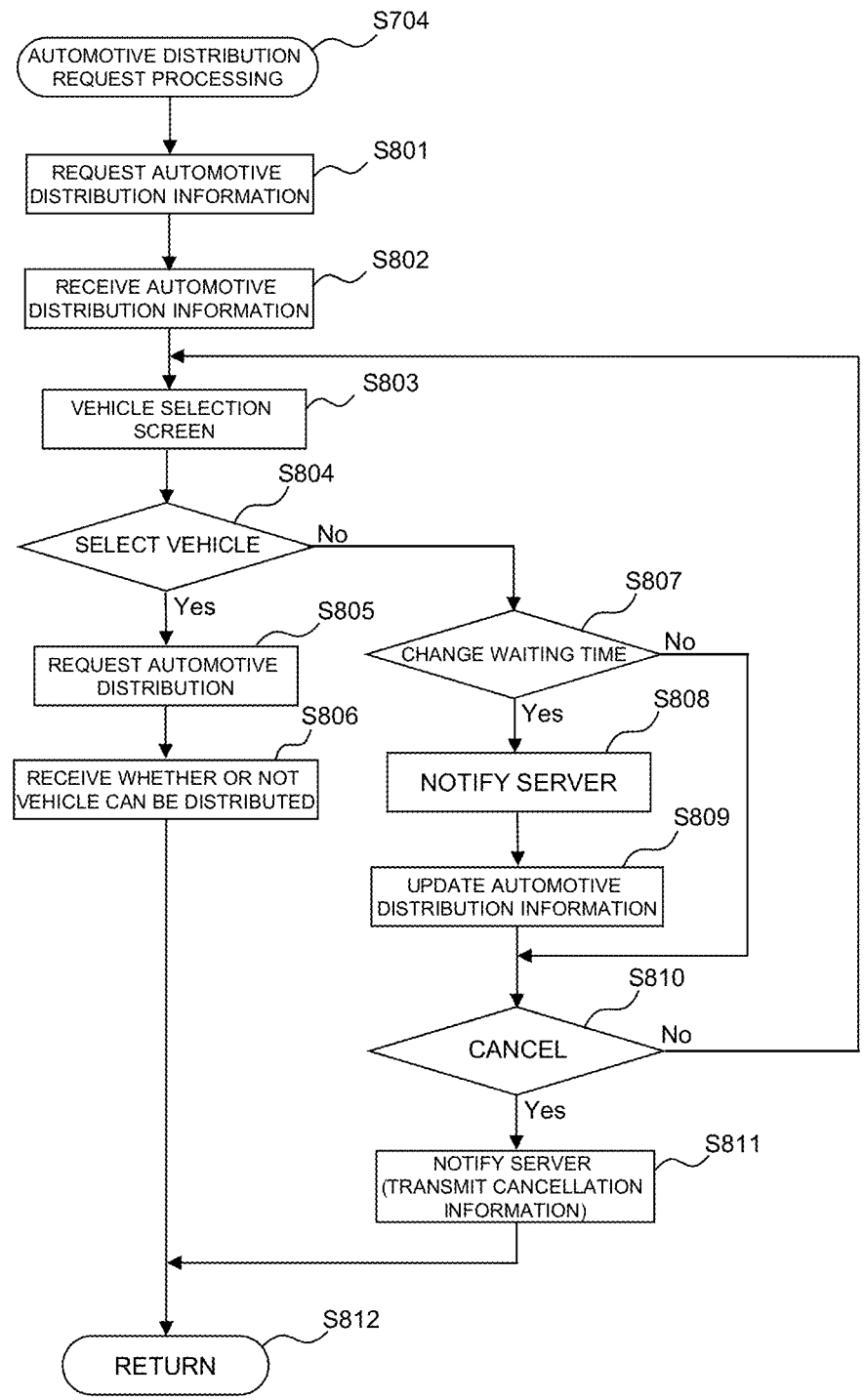
FIG. 8 is a flowchart explaining a detailed operation flow example of the user terminal in the automotive distribution system according to one embodiment of the present invention.

FIG. 8 is a flowchart of automotive distribution request processing (S704 in FIG. 7) in one embodiment of the present invention. In the automotive distribution request processing, the central processing unit (403 in FIG. 4) transmits an automotive distribution information request command to the automotive distribution management server (500 in FIG. 5) (step S801). The automotive distribution information request command is a command for requesting information of the vehicle that can be distributed, and includes the user ID and the current position of the user terminal. The automotive distribution management server receiving the automotive distribution information request command searches for a vehicle with the shortest moving time (waiting time for the user) to the user terminal out of vehicles in an empty state. The automotive distribution management server transmits vehicle information of the vehicle (vehicle that can be distributed) with the shortest waiting time to the user terminal. The vehicle information in this case includes the waiting time, the current position, the affiliation company, the usage price, the vehicle model name, the number of passengers that can board the vehicle and the like.

When receiving the vehicle information from the automotive distribution management server (step S802), the central processing unit of the user terminal causes the display unit (404 in FIG. 4) to display the vehicle selection screen (FIG. 9 and FIG. 10) (step S803).

Figure 9:
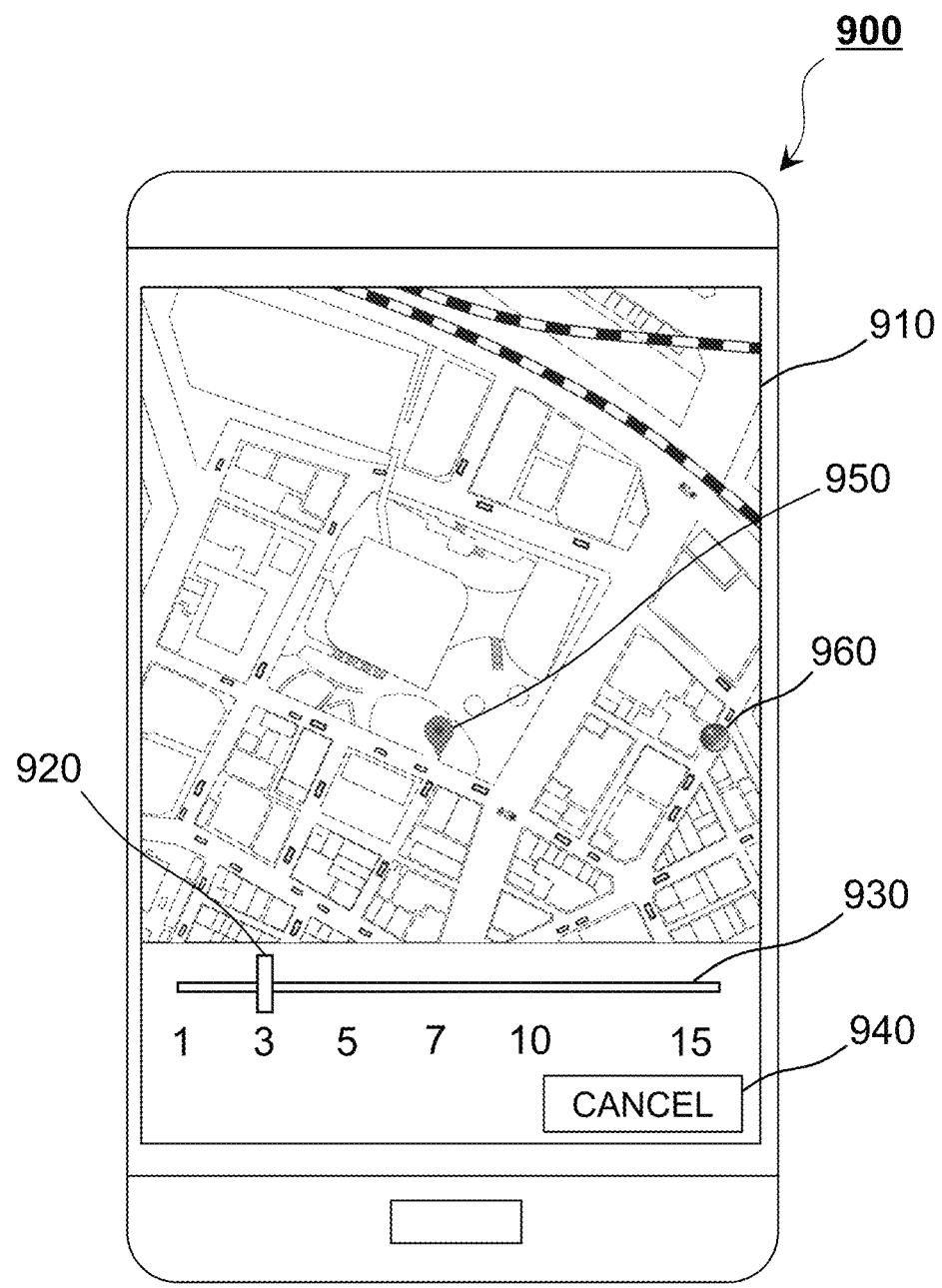
FIG. 9 is an explanatory view explaining a screen example of the user terminal in the automotive distribution system according to one embodiment of the present invention.
Figure 10:
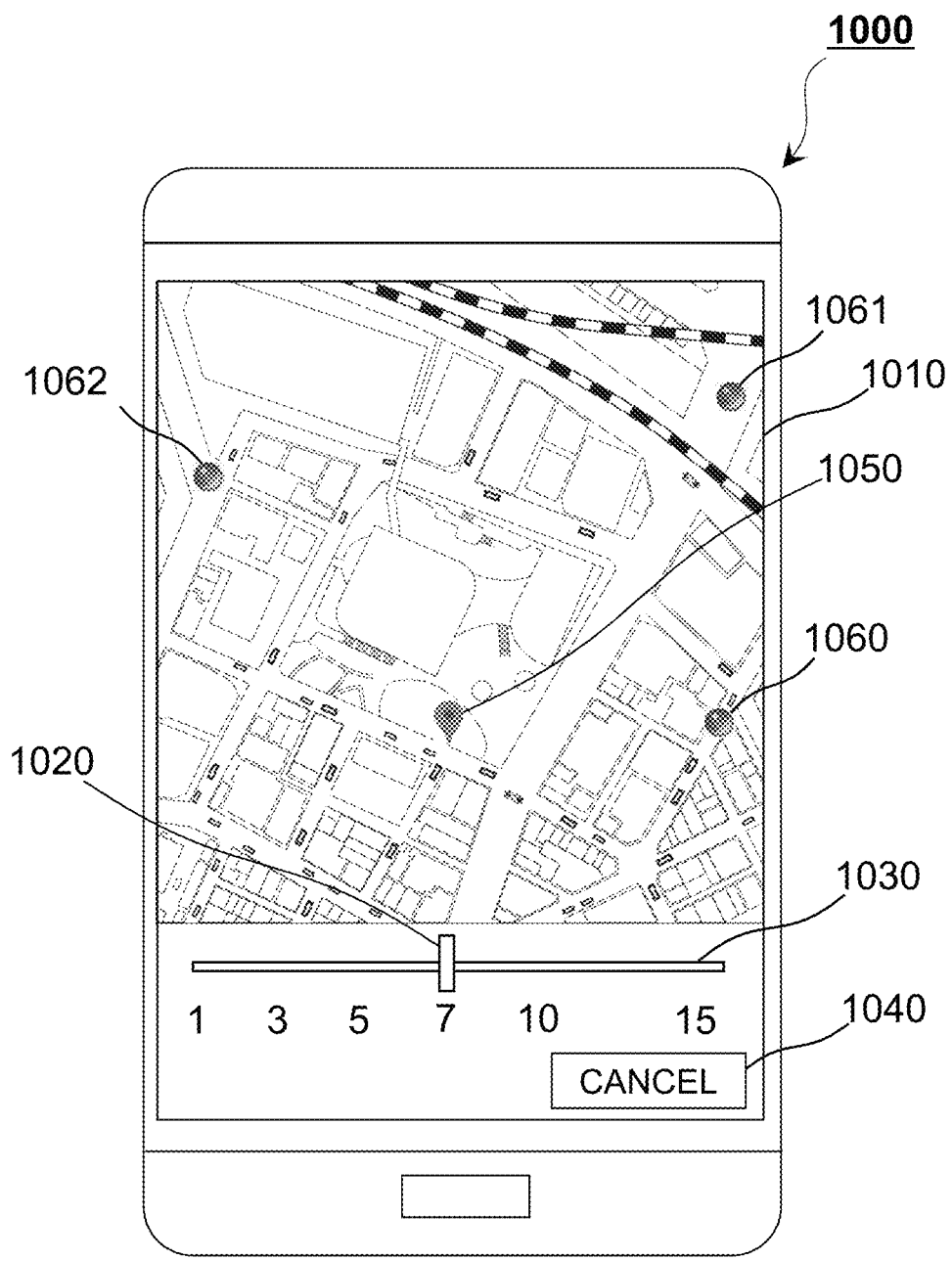
FIG. 10 is an explanatory view explaining a screen example of the user terminal in the automotive distribution system according to one embodiment of the present invention.

FIG. 9 shows an example of the vehicle selection screen in one embodiment of the present invention. The vehicle selection screen in FIG. 9 is in a smartphone 900, and includes a map screen 910, a slider 920, a scale bar 930, and a cancel button 940. The map screen 910 shows a surrounding map with the current position of the user terminal (smartphone) as a center. The map screen 910 includes a current position icon 950 showing the current position of the user terminal, and a vehicle icon 960 showing a vehicle that can be distributed. As described above, a vehicle requested to be distributed corresponding to the vehicle icon 960 is a vehicle with the shortest waiting time. When the user clicks the vehicle icon 960, an automotive distribution request confirmation screen including the vehicle attribute information, a message "distribute this vehicle?", an OK button, and a request determination cancel button is displayed (none is illustrated).

Alternatively, in another embodiment, the vehicle attribute information such as the affiliation company, usage price, and the number of passengers that can board the vehicle and the like may be displayed at a state when the vehicle icon 960 is displayed, without the user clicking the vehicle icon 960 (in this case, it is convenient because a plurality of vehicles can be compared with one another at a glance when the plurality of vehicles are displayed).

When the user selects the OK button, the vehicle is selected as the vehicle requested to be distributed, and the user terminal transmits the automotive distribution request command to the automotive distribution management server to request distribution of the vehicle requested to be distributed. When the request determination cancel button is selected on the automotive distribution request confirmation screen, the user terminal returns to the vehicle selection screen.

The vehicle attribute information displayed on the automotive distribution request screen includes, for example, the affiliation company, the usage price, the vehicle model name, and the number of passengers that can board the vehicle. Accordingly, it is possible for the user to select the vehicle requested to be distributed in consideration of not only the waiting time and the current position of the vehicle but also the vehicle attribute information.

The slider 920 is to set the waiting time, and the user can adjust a position in a lateral direction. In other words, the waiting time decreases as the user moves the slider 920 to the left, and the waiting time increases as the user moves the slider 920 to the right. The scale bar 930 is a bar indicating a movable range of the slider 920 (range of the waiting time), and includes numerical values (1, 3, 5, 7, 10, 15) indicating the waiting times. The cancel button 940 is a button for ending the automotive distribution request processing.

Returning to FIG. 8, when the vehicle icon 960 is selected in the vehicle selection screen, and the vehicle requested to be distributed is selected by the OK button being pressed on the automotive distribution request confirmation screen (step S804: Yes), the central processing unit transmits an automotive distribution request command to the automotive distribution management server via the communication interface unit (406 in FIG. 4) (step S805). The automotive distribution management server receiving the automotive distribution request command transmits an automotive distribution command to a vehicle (vehicle requested to be distributed) corresponding to the vehicle ID included in the automotive distribution request command, and commands distribution of the vehicle requested to be distributed, and when arrangement for distribution of the vehicle requested to be distributed can be made, the automotive distribution management server notifies the user terminal of completion of arrangement for the automotive distribution. The central processing unit of the user terminal receiving the notification of completion of the arrangement for automotive distribution causes the display unit to display the completion of the arrangement for automotive distribution (step S806 in FIG. 8).

When the vehicle requested to be distributed is already determined to be distributed to another user by an automotive distribution request from another user terminal, the central processing unit of the user terminal receives a notice that the vehicle cannot be distributed from the automotive distribution management server, and causes the display unit to display that the vehicle cannot be distributed (step S806 in FIG. 8). When the vehicle distribution is impossible, the central processing unit returns to step S801 again (not illustrated as the flow in FIG. 8), and displays a new vehicle that can be distributed.

Returning step S804 in FIG. 8, when the vehicle icon is not selected in the vehicle selection screen (step S804: No), the central processing unit determines whether or not change of the waiting time is performed (step S807). Specifically, the central processing unit determines whether or not the position of the slider 920 is changed. When the waiting time is changed (step S807: Yes), the central processing unit notifies the automotive distribution management server of the waiting time after being changed with the user ID and the current position of the user terminal (step S808). The automotive distribution management server receiving the notice searches for a vehicle in an empty state corresponding to the new waiting time, and transmits vehicle information of the vehicle (vehicle that can be distributed) corresponding to the new waiting time to the user terminal. The user terminal receiving the new vehicle information updates the vehicle information that is displayed on the vehicle selection screen (step S809). The vehicle information after update is used in new step S803.

FIG. 10 shows another example of the vehicle selection screen in one embodiment of the present invention. The vehicle selection screen in FIG. 10 is in a smartphone 1000, and includes a map screen 1010, a slider 1020, a scale bar 1030, and a cancel button 1040. The map screen 1010 shows a surrounding map with a current position of a user terminal (smartphone) as a center. The map screen 1010 includes a current position icon 1050 showing a current position of the user terminal, and vehicle icons 1060, 1061, and 1062 showing vehicles that can be distributed.

The vehicle icon 1060 corresponds to the vehicle icon 960 in FIG. 9. In other words, the vehicle icon 1060 corresponds to a vehicle that can be distributed with a shortest waiting time. There is nothing corresponding to the vehicle icons 1061 and 1062 in FIG. 9. This is because in the example in FIG. 10, the slider 1020 is located at the waiting time of seven minutes while in the example in FIG. 9, the slider 920 is located at the waiting time of three minutes. In other words, the icons 1061 and 1062 correspond to new vehicles that can be distributed and are searched for, as a result that the user changes the waiting time from three minutes to seven minutes by using the slider 1020.

As described above, when the user selects any of the vehicle icons 1060, 1061, and 1062 in one embodiment of the present invention, the vehicle attribute information of the vehicle corresponding to the icon is displayed on the automotive distribution request confirmation screen. Accordingly, the user can select the vehicle requested to be distributed in consideration of the vehicle attribute information. The example in FIG. 9 and the example in FIG. 10 are similar to each other concerning the operation on the automotive distribution request confirmation screen.

Alternatively, in another embodiment, vehicle attribute information such as affiliation companies, usage prices, and the numbers of passengers that can board the vehicles and the like of the respective vehicles may be displayed at a stage when the vehicle icons 1060, 1061 and 1062 are displayed without the user clicking the vehicle icon. In this case, it is convenient because the plurality of vehicles can be compared.

Returning to FIG. 8, after step S809, or when the waiting time is not changed (step S807: No), the central processing unit determines whether or not the cancel button (940 or the like in FIG. 9) is pressed (step S810). When the cancel button is pressed (step S810: Yes), the central processing unit transmits the cancellation information to the automotive distribution management server (step S811), and ends the automotive distribution request processing of this time (step S812). The cancellation information includes, information on the waiting time selected at the time of the cancel button being pressed, a place (current position of the user terminal) and a cancel time (a year, month and date may be included), and is used in relocation of the vehicle in the automotive distribution management server (details will be described later with reference to FIG. 11). When the cancel button is not pressed (step S810: No), the central processing unit returns to step S803.

In one embodiment of the present invention, the cancellation information can also include the following information in addition to the above described information, or in place of the above described information.
(1) User ID performing cancellation (information that can identify a member).
(2) Vehicle attribute information appearing in each of waiting times selected until the cancel button is pressed. The information is useful in analyzing why the vehicle was not selected by the user.
(3) Times when the respective waiting times selected until the cancel button is pressed were selected. Thereby, it is possible to know how long the user looked at the screens corresponding to the respective waiting times, for example.
(4) In a case where the user requested automotive distribution after the user canceled one time or more on the same day (including the day before dawn over time), a time and date and a place on which the automotive distribution request was made, and the vehicle attribute information concerning the vehicle of an automotive distribution request target as necessary.

Figure 11:
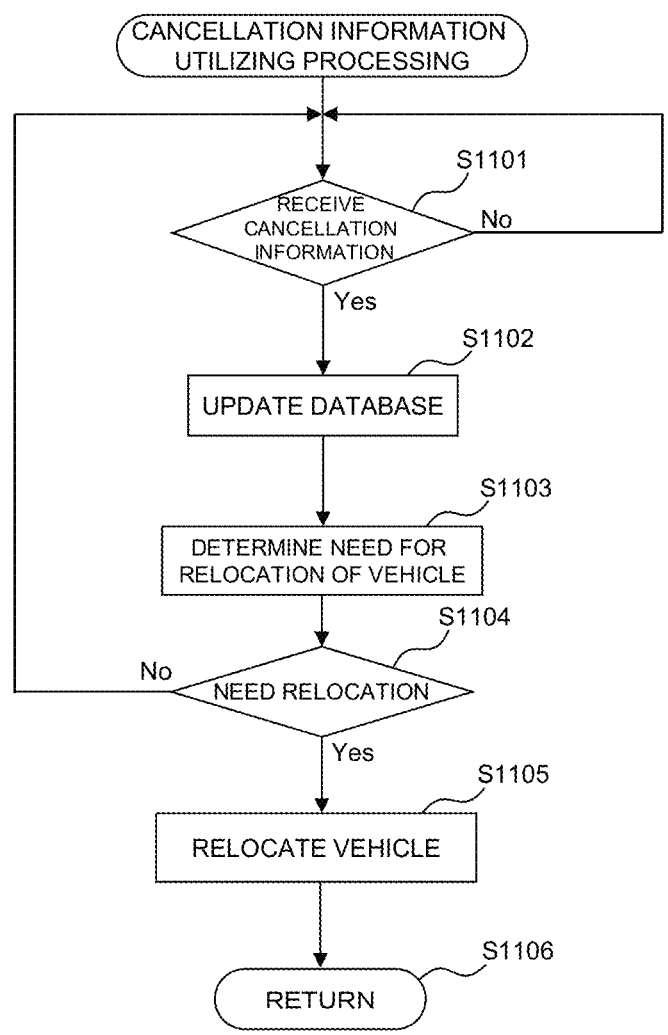
FIG. 11 is a flowchart explaining an operation flow example of the automotive distribution management server in the automotive distribution system according to one embodiment of the present invention.

FIG. 11 is a flowchart of cancellation information utilizing processing executed by the automotive distribution management server in one embodiment of the present invention. The cancellation information utilizing processing is processing that streamlines vehicle placement by using information (cancellation information) at the time of the user cancelling the automotive distribution request in the automotive distribution request processing in the user terminal. The CPU (501 in FIG. 5) of the automotive distribution management server continuously executes the cancellation information utilizing processing while the automotive distribution management server is operating.

In the cancellation information utilizing processing shown in FIG. 11, the automotive distribution management server determines whether or not it receives cancellation information from any of the user terminals (step S1101). When the automotive distribution management server receives the cancellation information (step S1101: Yes), the automotive distribution management server updates the database of the storage unit (502 in FIG. 5) by using the received cancellation information (step S1102). As described above, the cancellation information includes information on the waiting time selected when the cancel button is pressed, the place (current position of the user terminal) and the cancel time. Alternatively, in another embodiment, the cancellation information includes communication with the user terminal until the cancel is made (the user position at this time and time and date, the number of times the waiting time is changed, the last waiting time specified by the time when the cancel is made, the operation time until the cancel from start of the operation and the like). In the database, an average number of vehicles and the number of cancelled cases for the past constant period (for example, one month) are stored for each combination of an area and a time zone. The average number of vehicles is the number of vehicles (regardless of the service status) of the vehicles (taxis that are objects to be managed by the automotive distribution management server) existing in the area in the time zone. In addition, the database stores a target number of vehicles for each combination of the location and the time zone. The target number of vehicles is a target value of the number (regardless of the service status) of the vehicles (taxis that is the objects to be managed by the automotive distribution management server) existing in the area in the time zone.

Subsequently, the automotive distribution management server determines a need for vehicle relocation (step S1103). Specifically, the automotive distribution management server determines whether or not the number of cancelled cases exceeds a threshold in a combination of an area and a time zone to which new cancellation information belongs. When the number of cancelled cases exceeds the threshold, the automotive distribution management server calculates a difference between the target number of vehicles and the average number of vehicles with respect to the combination (target combination) of the area and the time zone. When the difference is negative (the average number of vehicles is sufficiently large with respect to the target number of vehicles), the automotive distribution management server determines that there is a need for vehicle relocation.

When there is a need for vehicle relocation (step S1104: Yes), the automotive distribution management server performs vehicle relocation with respect to the target combination (step S1105). Specifically, the automotive distribution management server increases the target number of vehicles of the target combination by a predetermined number. When the current number of vehicles of the target combination is less than the target number of vehicles, the automotive distribution management server gives vehicles an instruction to move the vehicles from a neighboring area in which the current number of vehicles is more than the target number of vehicles to the area. The instruction is performed by displaying a message requesting to move to the target area on the display unit of the vehicle that is in an empty state in the neighboring area, for example. In a case of step S1101: No or step S1104: No, the flow returns to step S1101. After step S1105, the cancellation information utilizing processing of this time is ended (step S1106).

According to the above, when a vehicle requested to be distributed is selected from one or a plurality of vehicles that can be distributed displayed for each of the waiting times accepted from the user in one embodiment of the present invention (step S804 in FIG. 8: Yes), the automotive distribution request processing of the vehicle requested to be distributed is executed (steps S617 to S623 in FIG. 6, steps S805 and S806 in FIG. 8). Accordingly, the user himself or herself can set the waiting time, and when the waiting time is not an allowable time for the user, the user can put off or cancel an automotive distribution request. Accordingly, it is possible to enhance convenience of the user.

(Other Variations)

In one embodiment of the present invention, the user terminal (terminal control device) causes the display unit to display one or a plurality of vehicles that can be distributed with the vehicle attribute information of the vehicles that can be distributed for each waiting time accepted (step S616 in FIG. 6, step S803 in FIG. 8, FIG. 9, FIG. 10). The vehicle attribute information includes the current position of the vehicle that can be distributed, the affiliation company, the usage price, the vehicle model name, and the number of passengers that can board the vehicle. Thereby, the user can determine whether to request automotive distribution or not after confirming the vehicle attribute information of the vehicle that can be distributed in addition to the waiting time. For example, when a plurality of vehicles that can be distributed with the same waiting time are displayed, the user can select the vehicle requested to be distributed by comparing the vehicle attribute information. Accordingly, it is possible to further enhance convenience of the user.

In one embodiment of the present invention, the display unit (404) of the user terminal (400) is a touch panel (FIG. 3, FIG. 9, FIG. 10). Further, the central processing unit (403) (terminal control device) of the user terminal (400) causes the touch panel to display the slider (920, 1020) as input display of the waiting time (FIG. 9, FIG. 10). This enables the user to perform input of the waiting time smoothly.

In one embodiment of the present invention, the central processing unit (403) (terminal control device) of the user terminal (400) displays one or a plurality of vehicles that can be distributed on the map screen (910, 1010) in the display unit (404) (display device) as the vehicle icons (960, 1060 to 1062) for each waiting time accepted by the input unit (401) (operation input device) (FIG. 9, FIG. 10). This enables the user himself or herself to determine the waiting time and select the vehicle requested to be distributed if the user has a good knowledge of the place, for example. Accordingly, it is possible to further enhance convenience of the user.

In one embodiment of the present invention, the central processing unit (403) (terminal control device) of the user terminal (400) causes the display unit (404) (display device) to display the vehicle that can be distributed with the shortest waiting time with the shortest waiting time before accepting the waiting time from the user (step S612 in FIG. 6, steps S801 to S803 in FIG. 8, FIG. 9). This enables the user to easily know the shortest waiting time.

In one embodiment of the present invention, in a case where the automotive distribution request is not performed and cancellation is performed although the vehicle that can be distributed is displayed in the user terminal (400) (step S810 in FIG. 8: Yes), the user terminal notifies the automotive distribution management server (500) of cancellation information (step S811 in FIG. 8). At this time, in one embodiment, the automotive distribution management server manages the cancellation information and information concerning one or a plurality of vehicles that can be distributed corresponding to the waiting time inputted to the input unit (401) (operation input device) by associating the cancellation information with the information concerning the one or the plurality of vehicles that can be distributed (FIG. 11). Thereby it is possible to use cancellation procedure by the user, and the waiting time (or the vehicle that can be distributed corresponding to the waiting time) by associating the cancellation procedure with the waiting time.

(Further Variations)

In the aforementioned embodiment, the vehicle that can be distributed with the shortest waiting time is displayed in the user terminal, when automotive distribution guidance is started (step S612 in FIG. 6, steps S801 to S803 in FIG. 8, FIG. 9), but the present invention is not limited to this. For example, control can be performed so that the vehicle that can be distributed is not displayed when starting the automotive distribution guidance, and the vehicle that can be distributed is displayed only when the user inputs the waiting time.

In the aforementioned embodiment, the waiting time is from the current position of the vehicle that can be distributed to the current position of the user terminal (400) (in other words, the current position of the user terminal is the target vehicle distribution position), but the present invention is not limited to this, and the waiting time may be to the target automotive distribution position (position other than the current position of the user terminal) separately inputted in the user terminal. In that case, for example, at a stage of requesting automotive distribution (step S617 in FIG. 6), the vehicle requested to be distributed may be notified of the target automotive distribution position from the user terminal via the automotive distribution management server, and the target automotive distribution position may be displayed on the display unit of the vehicle requested to be distributed.

In the aforementioned embodiment, the vehicle information of the vehicle that can be distributed is acquired from the automotive distribution management server correspondingly to the single waiting time, and when a new waiting time is set, the vehicle information of the vehicle that can be distributed is acquired from the automotive distribution management server again (S613 to S616 in FIG. 6), but the present invention is not limited to this. For example, at a stage when a single waiting time is selected, but the user does not input a new waiting time, vehicle information of the vehicle that can be distributed for another waiting time may be acquired. Alternatively, from the beginning, vehicle information of vehicles that can be distributed may be acquired for the entire range or part of the range of the slider (920, 1020) based on the current position (or the target automotive distribution position) of the user terminal.

In the aforementioned embodiment, input of the waiting time by the user is performed by using the slider (920, 1020) (FIG. 9, FIG. 10), but the present invention is not limited to this. For example, a radio button may be used instead of the slider. Alternatively, an increase button and a decrease button for the waiting time are provided, and the waiting time may be changed by operation of these buttons.

In the aforementioned embodiment, a unit of the waiting time is time ("minute") (FIG. 9, FIG. 10), but the present invention is not limited to this, and a distance ("m") from the current position of a vehicle that can be distributed to the current position of the user terminal may be used to indicate the waiting time.

In the aforementioned embodiment, all the vehicles that can be distributed with the selected waiting time or less are displayed. For example, when seven minutes is selected as the waiting time, all the vehicles that can be distributed with the waiting times of seven minutes or less are displayed (FIG. 10). However, the present invention is not limited to this. For example, it is also possible to display vehicles that can be distributed within a predetermined time range with the selected waiting time as a reference. For example, when seven minutes is selected as the waiting time, it is possible to display vehicles that can be distributed with the waiting times being in a range of five to seven minutes, and display no vehicle that can be distributed with the waiting time being less than five minutes. In this case, it is possible to change the range of five to seven minutes to a range of three to five minutes, or to a range of five to nine minutes by dragging both ends of the slider with a finger. In this case, the slider has an operation specification that can specify the range.

In the aforementioned embodiment, the vehicles that can be distributed are displayed on the map screen (FIG. 9, FIG. 10), but the present invention is not limited to this, and the vehicles that can be distributed may be displayed in a list, for example.

In the aforementioned embodiment, the driver of the vehicle determines whether or not the vehicle requested to be distributed can be distributed actually (step S620 in FIG. 6), but the present invention is not limited to this, and, for example, when the vehicle is a self-driving vehicle, the central processing unit (203 in FIG. 2) of the vehicle may determine whether or not the vehicle requested to be distributed can be actually distributed.

In the aforementioned embodiment, the cancellation information is used by being transmitted from the user terminal to the automotive distribution management server (step S811 in FIG. 8, FIG. 11), but use of the cancellation information may be omitted.

As above, the embodiment of the automotive distribution system and the like according to the present invention is described based on the specific examples. However, as an embodiment of the present invention, in addition to a method or a program for implementing the system or the device, it is also possible to take a mode of implementation as a storage medium recording the program (for example, an optical disk, a magneto-optical disk, a CD-ROM, a CD-R, a CD-RW, a magnetic tape, a hard disk, and a memory card) or the like.

Further, an implementation form of the program is not limited to an application program of an object code compiled by a compiler, a program code executed by an interpreter or the like, and may be a form of a program module or the like incorporated in an operating system.

Further, the program is not configured such that the processing of the program does not have to be wholly implemented only in the CPU on the control board, but can also be configured such that the processing is implemented partly or wholly by an expansion board attached to the board or another processing unit (DSP or the like) mounted on the expansion unit as necessary.

It is possible to combine all the components described in the present specification (including claims, abstract, and drawing) and/or all the methods or all process steps disclosed in the present specification in any combination except for the combination in which these features are mutually exclusive.

Further, it is possible to replace the respective features described in the present specification (including claims, abstract, and drawings) with alternative features that serve the same purpose, equivalent purpose, or similar purpose, unless expressly denied. Accordingly, unless expressly denied, each of the features disclosed is merely one example of a generic series of identical or equivalent features.

Furthermore, the present invention is not limited to any specific configuration of the above described embodiment. The present invention can be extended to all novel features described in the present specification (including claims, abstract, and drawings) or combinations thereof, or all novel methods or process steps described, or combinations thereof.

REFERENCE SIGNS LIST

10 Automotive distribution system
11 Automotive distribution management server (group)
12a to 12c Vehicle (taxi or the like)
13a to 13c User terminal (user terminal such as a smartphone, information processing device)
19 Public line (dedicated line, the Internet or the like)

What is claimed is:

1. A user terminal, comprising:
an operation input device accepting an operation input of a user;
a terminal communication device wirelessly communicating with an automotive distribution management server;
a display device;
a current position identifying device determining a current position of the user terminal by receiving a global positioning system (GPS) signal or an external wireless signal of a predetermined wireless communication protocol, and
a terminal control device controlling the operation input device, the terminal communication device, the display device and the current position identifying device,
wherein the terminal control device
causes the operation input device to receive an input of one or more waiting times and a requested automotive distribution position based on the current position of the user terminal identified by the current position identifying device or a target automotive distribution position inputted via the operation input device by the user, the one or more waiting times indicating an amount of time the user is willing to wait until a vehicle is distributed to the requested automotive distribution position, causes the terminal communication device to wirelessly receive wait time information of each of a plurality of vehicles from the automotive distribution management server, the wait time information being an amount of time for a corresponding vehicle to travel from a current position of the corresponding vehicle to the requested automotive distribution position, causes the display device to display only at least one of the plurality of vehicles that can be distributed within the one or more waiting times, for each of the received one or more waiting times, when a single vehicle is selected from the at least one of the plurality of vehicles that can be distributed via the operation input device, causes the terminal communication device to wirelessly transmit to the automotive distribution management server an automotive distribution request for requesting the selected vehicle for distribution to the requested automotive distribution position, and when a cancel operation of the automotive distribution request is made via the operation input device, the terminal control device stops receiving further inputting via the operation input device, and sends at least one of information consisting of (a) the one or more waiting times received before the cancel operation was made, (b) the current position of the user terminal, and (c) time of the cancel operation, to the automotive distribution management server, such that the automotive distribution management server uses the at least one of information to change a placement of the vehicles.

2. The user terminal according to claim 1, wherein the terminal control device causes the display device to display one or a plurality of the vehicles that can be distributed with vehicle attribute information of the vehicles that can be distributed, for each of the waiting times that are accepted, and the vehicle attribute information includes at least one of a current position, an affiliation company, a usage price, a vehicle model name, and a number of passengers that can board the vehicle of each of the vehicles that can be distributed.

3. The user terminal according to claim 1, wherein the operation input device is a touch panel, and the terminal control device causes the touch panel to display a slider or a radio button as input display of the waiting time.

4. The user terminal according to claim 1, wherein the terminal control device causes one or the plurality of the vehicles that can be distributed to be displayed on a map screen in the display device, for each of the waiting times accepted by the operation input device.

5. The user terminal according to claim 1, wherein the terminal control device causes the display device to display the plurality of vehicles that can be distributed with a shortest waiting time and the shortest waiting time, before accepting the waiting time from the user.

6. An automotive distribution system comprising:

a plurality of vehicles each including a vehicle current position detection device, a vehicle communication device, and a vehicle control device, the vehicle current position detection device of each of the plurality of vehicles determines a current position of a corresponding vehicle by receiving a global positioning system (GPS) signal or an external wireless signal of a predetermined wireless communication protocol;

a user terminal including an operation input device, a terminal communication device, a display device, a user terminal current position detection device and a terminal control device, the user terminal current position detection device determining a current position of the user terminal by receiving the global positioning system (GPS) signal or an external wireless signal of a predetermined wireless communication protocol; and an automotive distribution management server including a server communication device, a server control device, and a storage device, wherein the vehicle control device of each of the plurality of vehicles determines the current position of the corresponding vehicle by receiving the global positioning system (GPS) signal or the external wireless signal and transmits the current position to the automotive distribution management server with vehicle identification information of the corresponding vehicle at a predetermined timing, the server control device of the automotive distribution management server stores in the storage device the current position received from each of the plurality of vehicles with the vehicle identification information, when the user terminal receives an automotive distribution guidance request from a user via the operation input device, the user terminal receives, via the operation input device, a requested automotive distribution position and a wait time, the requested automotive distribution position being the current position of the user terminal identified by the current position identifying device or a target automotive distribution position inputted via the operation input device by the user, the wait time indicating an amount of time the user is willing to wait until a vehicle is distributed to the requested automotive distribution position, and transmits, via the terminal communication device, to the automotive distribution management server, an automotive distribution start request including the requested automotive distribution position, upon receiving the automotive distribution start request from the user terminal, the automotive distribution management server transmits, to the user terminal, the vehicle identification information, the current position and distribution time of the plurality of vehicles that can be distributed, the distribution time being calculated from the current position of the vehicle to the requested automotive distribution position upon receiving the vehicle identification information, the current position and distribution time to the requested automotive distribution position of the plurality of vehicles that can be distributed from the automotive distribution management server, the user terminal causes the display device to display only at least one of the plurality of the vehicles that can be distributed within the waiting time by comparing the waiting time and the distribution time of each of the plurality of vehicle, when a single vehicle is selected from the at least one of the plurality of vehicles that can be distributed via the operation input device, the user terminal transmits to the automotive distribution management server an automotive distribution request for requesting a distribution of the selected vehicle to the requested automotive distribution position by transmitting the vehicle identification information of the selected vehicle, the automotive distribution management server receiving the automotive distribution request from the user terminal transmits an automotive distribution command including the requested automotive distribution position to the selected vehicle, upon receiving automotive distribution command from the automotive distribution management server, the selected vehicle displays the automotive distribution command on the vehicle display device, or is caused to be distributed to the requested automotive distribution position, and when the automotive distribution request has not been transmitted from the user terminal, and when a cancel operation is performed on the user terminal while the plurality of vehicles that can be distributed are being displayed on the display device of the user terminal, the user terminal stops receiving further inputting via the operation input device, and sends at least one of information consisting of (a) the waiting time received before the cancel operation was made, (b) the current position of the user terminal, and (c) time of the cancel operation, to the automotive distribution management server, such that the automotive distribution management server uses the at least one of information to change a placement of the vehicles.

7. The automotive distribution system according to claim 6, wherein when the automotive distribution request is not made and the cancel operation is performed although the vehicles that can be distributed are displayed, in the user terminal, the user terminal notifies the automotive distribution management server of cancellation information, and the automotive distribution management server associates the cancellation information with information concerning one or a plurality of the vehicles that can be distributed corresponding to the waiting time inputted to the operation input device and manages the cancellation information and the information concerning the one or the plurality of the vehicles that can be distributed corresponding to the waiting time.

8. A method for operating on a user terminal including an operation input device accepting an operation input of a user, a terminal communication device wirelessly communicating with an automotive distribution management server, a display device, a current position identifying device determining a current position of the user terminal by receiving a global positioning system (GPS) signal or an external wireless signal of a predetermined wireless communication protocol, and a terminal control device controlling the operation input device, the terminal communication device, the display device and the current position identifying device, and the method comprising steps of causing the terminal control device to causes the operation input device to receive an input of one or more waiting times and a requested automotive distribution position based on the current position of the user terminal identified by the current position identifying device or a target automotive distribution position inputted via the operation input device by the user, the one or more waiting times indicating an amount of time the user is willing to wait until a vehicle is distributed to the requested automotive distribution position, causes the terminal communication device to wirelessly receive wait time information of each of a plurality of vehicles from the automotive distribution management server, the wait time information being an amount of time for a corresponding vehicle to travel from a current position of the corresponding vehicle to the requested automotive distribution position, cause the display device to display only at least one of the plurality of vehicles that can be distributed within the one or more waiting times, for each of the received one or more waiting, when a single vehicle is selected from the at least one of the plurality of vehicles that can be distributed via the operation input device, causes the terminal communication device to wirelessly transmit to the automotive distribution management server an automotive distribution request for requesting the selected vehicle for distribution to the requested automotive distribution position, and stop receiving further inputting via the operation input device, and send at least one of information consisting of (a) the one or more waiting times received before a cancel operation was made, (b) the current position of the user terminal, and (c) time of the cancel operation, to the automotive distribution management server when the cancel operation of the automotive distribution request is made via the operation input device, such that the automotive distribution management server uses the at least one of information to change a placement of the vehicles.

9. A method executed on an automotive distribution system including a plurality of vehicles each including a vehicle current position detection device, a vehicle communication device, and a vehicle control device, a user terminal including an operation input device, a terminal communication device, a display device, a user terminal current position detection device and a terminal control device, and an automotive distribution management server including a server communication device, a server control device, and a storage device, and the method comprising steps of:

causing the vehicle current position detection device to determine the current position of a corresponding vehicle by receiving a global positioning system (GPS) signal or an external wireless signal of a predetermined wireless communication protocol and the vehicle control device of each of the plurality of vehicles to transmit the current position to the automotive distribution management server with vehicle identification information of the corresponding vehicle at a predetermined timing, causing the server control device to store, in a storage device of the automotive distribution management server, the current position received from each of the plurality of vehicles with the vehicle identification information, causing the user terminal to receive an automotive distribution guidance request from a user via the operation input device, causing the user terminal to receive, via the operation input device, a requested automotive distribution position and a wait time, the requested automotive distribution position being a current position of the user terminal identified by the current position identifying device by receiving the global positioning system (GPS) signal or an external wireless signal of a predetermined wireless communication protocol, or a target automotive distribution position inputted via the operation input device by the user, the wait time indicating an amount of time the user is willing to wait until a vehicle is distributed to the requested automotive distribution position, causing the terminal communication device to transmit, to the automotive distribution management server, an automotive distribution start request including the requested automotive distribution position, upon receiving the automotive distribution start request from the user terminal, causing the automotive distribution management server to calculate distribution time of each of the plurality of vehicles that can be distributed from the current position of the corresponding vehicle to the requested automotive distribution position and to transmit, to the user terminal, the vehicle identification information, the current position and the distribution time of the plurality of vehicles that can be distributed, upon receiving the vehicle identification information, the current position and distribution time to the requested automotive distribution position of the plurality of vehicles that can be distributed from the automotive distribution management server, causing the user terminal to cause the display device to display only at least one of the plurality of vehicles that can be distributed within the waiting time by comparing the waiting time and the distribution time of each of the plurality of vehicle, when a single vehicle is selected from at least one of the plurality of vehicles that can be distributed via the operation input device, causing the user terminal to transmit to the automotive distribution management server an automotive distribution request for requesting a distribution of the selected vehicle to the requested automotive distribution position by transmitting the vehicle identification information of the selected vehicle, causing the automotive distribution management server receiving the automotive distribution request from the user terminal to transmit an automotive distribution command including the requested automotive distribution position to the selected vehicle, upon receiving automotive distribution command from the automotive distribution management server, causing the selected vehicle to display the automotive distribution command on the vehicle display device, or causing the selected vehicle to be distributed to the requested automotive distribution position, and causing the user terminal to stop receiving further inputting via the operation input device, and to send at least one of information consisting of (a) the waiting time received before a cancel operation was made, (b) the current position of the user terminal, and (c) time of the cancel operation, to the automotive distribution management server when the automotive distribution request has not been transmitted from the user terminal, and when the cancel operation is performed on the user terminal while the plurality of vehicles that can be distributed are being displayed on the display device of the user terminal, such that the automotive distribution management server uses the at least one of information to change a placement of the vehicles.

\* \* \* \* \*